(12) United States Patent
Hayford et al.

(10) Patent No.: US 9,752,442 B2
(45) Date of Patent: Sep. 5, 2017

(54) AIRFOIL WITH VARIABLE PROFILE RESPONSIVE TO THERMAL CONDITIONS

(71) Applicant: United Technologies Corporation, Farmington, CT (US)

(72) Inventors: Richard K. Hayford, Cape Neddick, ME (US); Paul M. Lutjen, Kennebunkport, ME (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days.

(21) Appl. No.: 15/267,186

(22) Filed: Sep. 16, 2016

(65) Prior Publication Data

US 2017/0002666 A1 Jan. 5, 2017

Related U.S. Application Data

(63) Continuation of application No. 13/728,075, filed on Dec. 27, 2012, now Pat. No. 9,650,898.

(51) Int. Cl.
*F01D 5/28* (2006.01)
*F01D 5/14* (2006.01)
*F02C 3/04* (2006.01)

(52) U.S. Cl.
CPC .............. *F01D 5/28* (2013.01); *F01D 5/148* (2013.01); *F02C 3/04* (2013.01); *F05D 2220/32* (2013.01); *F05D 2300/10* (2013.01); *F05D 2300/50212* (2013.01); *Y02T 50/673* (2013.01)

(58) Field of Classification Search
CPC . F01D 5/148; F01D 5/28; F01D 5/147; F01D 11/18; F01D 5/12; F01D 5/14; Y02T 50/673; F05D 2300/501; F05D 2300/502; F05D 2300/5021; F05D 2300/50211; F05D 2300/50212; F05D 2300/505
See application file for complete search history.

(56) References Cited

U.S. PATENT DOCUMENTS

| | | | | |
|---|---|---|---|---|
| 3,038,698 | A | * | 6/1962 | Troyer .................... F01D 5/148 415/12 |
| 3,042,371 | A | * | 7/1962 | Fanti ..................... F04D 29/368 244/219 |
| 4,619,580 | A | | 10/1986 | Snyder |
| 4,778,339 | A | | 10/1988 | Usui et al. |

(Continued)

OTHER PUBLICATIONS

International Search Report and Written Opinion for International Application No. PCT/US2013/074514 completed on Mar. 14, 2014.

(Continued)

*Primary Examiner* — Gregory Anderson
*Assistant Examiner* — Eldon Brockman
(74) *Attorney, Agent, or Firm* — Carlson, Gaskey & Olds, P.C.

(57) ABSTRACT

An airfoil includes an airfoil body having a first section and a second section that differ in coefficient of thermal expansion by at least 10% and that each have a through-thickness that is 20% or greater than a through-thickness of the airfoil body. The second section is arranged in thermomechanical juxtaposition with the first section such that the first section and the second section cooperatively thermomechanically control a profile of the airfoil body responsive to varying thermal conditions.

19 Claims, 3 Drawing Sheets

(56) References Cited

U.S. PATENT DOCUMENTS

| | | | | |
|---|---|---|---|---|
| 4,969,799 | A * | 11/1990 | Usui | F04D 29/368 |
| | | | | 415/12 |
| 6,190,133 | B1 * | 2/2001 | Ress, Jr. | F01D 5/147 |
| | | | | 416/223 A |
| 8,011,882 | B2 | 9/2011 | McMillan | |
| 8,202,056 | B2 | 6/2012 | Rice | |
| 2003/0223861 | A1 | 12/2003 | Morrison et al. | |
| 2007/0020105 | A1 | 1/2007 | Albrecht et al. | |
| 2007/0292274 | A1 | 12/2007 | Burdgick et al. | |
| 2008/0253887 | A1 | 10/2008 | Cairo et al. | |
| 2009/0028697 | A1 | 1/2009 | Shi et al. | |
| 2009/0185911 | A1 | 7/2009 | Roberge | |
| 2010/0021290 | A1 | 1/2010 | Schaff et al. | |
| 2010/0095684 | A1 | 4/2010 | Rice | |
| 2012/0183718 | A1 * | 7/2012 | Fabre | F01D 5/16 |
| | | | | 428/67 |

OTHER PUBLICATIONS

International Preliminary Report on Patentability for PCT Application No. PCT/US2013/074514, mailed Jul. 9, 2015.
U.S. Appl. No. 13/676,793, filed Nov. 14, 2012, entitled Aircraft Engine Component With Locally Tailored Materials.

* cited by examiner

AIRFOIL WITH VARIABLE PROFILE RESPONSIVE TO THERMAL CONDITIONS

CROSS-REFERENCE TO RELATED APPLICATION

The present disclosure is continuation of U.S. patent application Ser. No. 13/728,075, filed Dec. 27, 2012.

BACKGROUND

This disclosure relates to airfoils. Gas turbine engines and other turbomachines include airfoils in the form of static vanes and rotatable blades. The shape of the airfoils can change based on the operational conditions with respect to stress loads, thermal expansion/contraction and other factors. Typically, the airfoils are designed to particular operational conditions for optimum performance at those conditions.

SUMMARY

An airfoil according to an exemplary aspect of the present disclosure includes an airfoil body having a first section and a second section that differ by coefficient of thermal expansion. The second section is arranged in thermomechanical juxtaposition with the first section such that the first section and the second section cooperatively thermomechanically control a profile of the airfoil body responsive to varying thermal conditions.

In a further non-limiting embodiment of any of the foregoing examples, the first section and the second section differ by composition.

In a further non-limiting embodiment of any of the foregoing examples, the first section and the second section are different composition metallic materials.

In a further non-limiting embodiment of any of the foregoing examples, the first section and the second section are different compositions selected from aluminum, aluminum alloys, titanium, titanium alloys, iron, iron alloys, nickel, nickel alloys, cobalt, cobalt alloys and combinations thereof.

In a further non-limiting embodiment of any of the foregoing examples, the first section and the second section each have a through-thickness that is 20% or greater than a through-thickness of the airfoil body.

A further non-limiting embodiment of any of the foregoing examples includes a distinct boundary between the first section and the second section.

A further non-limiting embodiment of any of the foregoing examples includes a compositional gradient boundary between the first section and the second section.

In a further non-limiting embodiment of any of the foregoing examples, the first section is a core and the second section is a shell circumscribing the core.

In a further non-limiting embodiment of any of the foregoing examples, the core terminates at an intermediate span between ends of the airfoil body.

In a further non-limiting embodiment of any of the foregoing examples, the core tapers along a span-wise direction of the airfoil body.

In a further non-limiting embodiment of any of the foregoing examples, one of the first section and the second section has a suction side surface of the airfoil body and the other of the first section and the second section has a pressure side surface of the airfoil body.

In a further non-limiting embodiment of any of the foregoing examples, at least one of the first section and the second section includes a cross-pattern.

In a further non-limiting embodiment of any of the foregoing examples, one of the first section and the second section has a pressure side surface and an opposed suction side surface, and the other of the first section and the second section partially covers at least one of the pressure side surface and the suction side surface.

A turbomachine according to an exemplary aspect of the present disclosure includes an airfoil that has an airfoil body having a first section and a second section that differ by coefficient of thermal expansion. The second section is arranged in thermomechanical juxtaposition with the first section such that the first section and the second section cooperatively thermomechanically control a profile of the airfoil body responsive to varying thermal conditions.

A further non-limiting embodiment of any of the foregoing examples includes a turbine section that has the airfoil.

A further non-limiting embodiment of any of the foregoing examples includes a compressor section and a combustor in fluid communication with the compressor section, the turbine section in fluid communication with the combustor.

A method of controlling an airfoil profile according to an exemplary aspect of the present disclosure includes controlling a profile of an airfoil body in response to varying thermal conditions by thermomechanically juxtaposing a first section and a second section of the airfoil body that differ by coefficient of thermal expansion.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
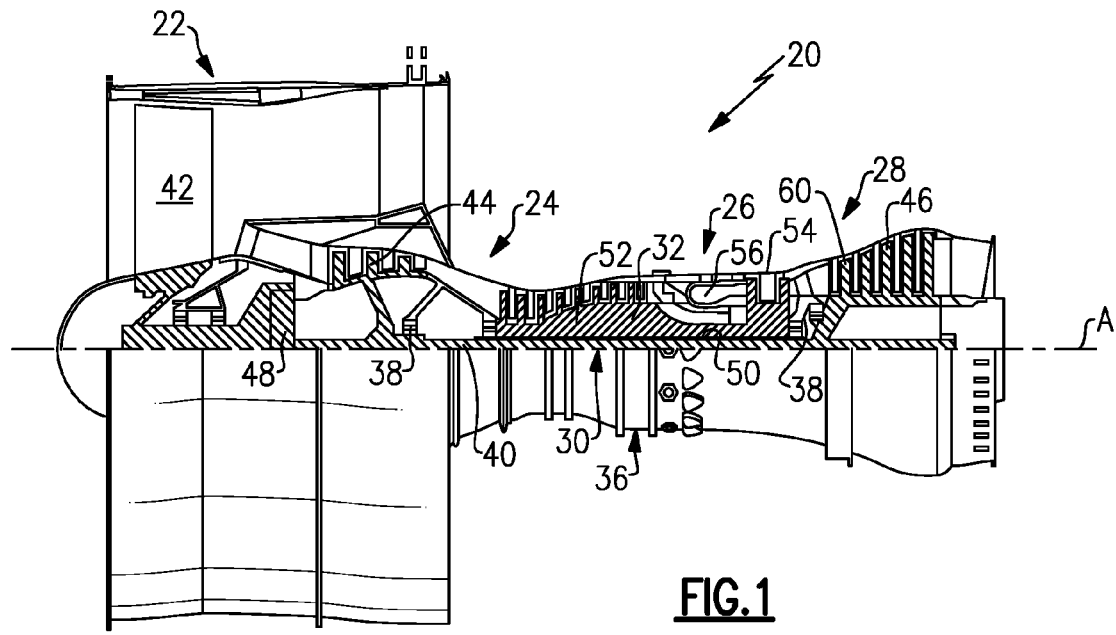
FIG. 1 illustrates an example turbomachine.

FIG. 1 schematically illustrates a turbomachine 20. In this example, the turbomachine 20 is a gas turbine engine, which is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans and the teachings may be applied to other types of turbomachines, including three-spool engine architectures, ground-based engines, air cycle machines, vacuum pumps and the like.

The turbomachine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The turbomachine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about five (5). The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow due to the high bypass ratio. The fan section 22 of the turbomachine 20 is designed for a particular flight condition—typically cruise at about 0.8 Mach and about 35,000 feet, with the engine at its best fuel consumption. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.45. "Low corrected fan tip speed" is the actual fan tip speed in feet per second divided by an industry standard temperature correction of $[(Tram\ °R)/(518.7°\ R)]^{0.5}$. The "Low corrected fan tip speed" as disclosed herein according to one non-limiting embodiment is less than about 1150 feet per second.

The turbine section 28 of the turbomachine 20 includes an airfoil 60. The airfoil 60 is a rotatable blade in this example, although it is to be understood that the airfoil 60 can alternatively be a static vane or can be a blade or vane in another section of the turbomachine 20.

Airfoils can experience varying thermal and pressure conditions in operation, such as temperature/pressure variations at different flight stages or temperature/pressure variations radially across the surfaces of the airfoil. Airfoils can be designed to have a particular geometry profile at given design point conditions to achieve a desired aerodynamic performance. However, the profile of the airfoil changes with changing thermal conditions due to thermal expansion/contraction, rotational speed, pressure loading, etc. Thus, the profile varies from the design point to a profile that may not provide as good aerodynamic performance. In this regard, as will be described in further detail below, the airfoil 60 provides for passive profile control in order to achieve more desirable profiles at varied thermal conditions.

Figure 2:
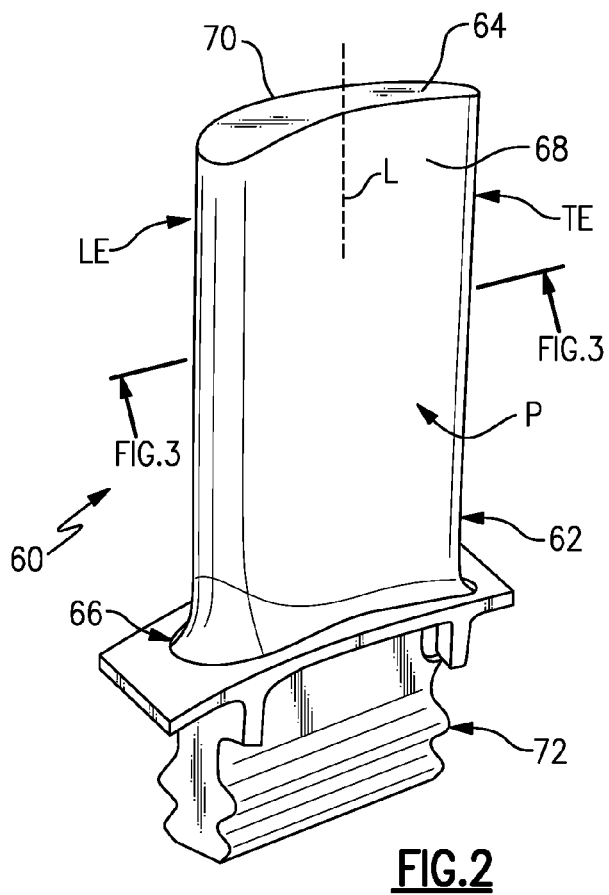
FIG. 2 illustrates an example airfoil of a turbomachine.

FIG. 2 shows an isolated view of one of the airfoils 60. Again, although the airfoil 60 is shown herein as a blade, the examples are also applicable to vanes and other components of a gas turbine engine. The airfoil 60 includes an airfoil body 62 that generally extends between a leading edge LE and a trailing edge TE, a first end 64 (i.e., tip) and a second end 66 (i.e., root), and a first side surface 68 and a second side surface 70. In this example, the first side surface 68 is a pressure side surface and the second side surface 70 is a suction side surface. In this example, the airfoil body 62 is connected to a root portion 72, for mounting the airfoil 60 in a known manner.

Figure 3:
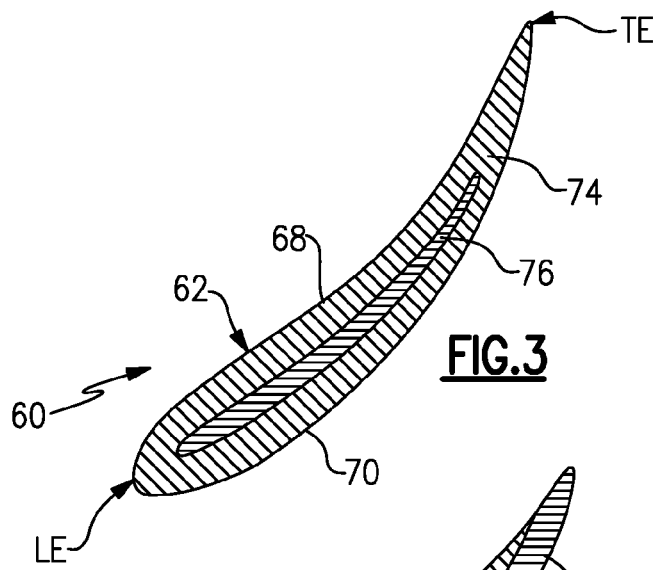
FIG. 3 illustrates a sectional view of the airfoil of FIG. 2.
Figure 4:
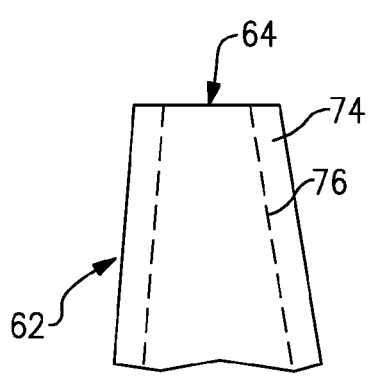
FIG. 4 illustrates a plan view of a portion of the airfoil of FIG. 2.

FIG. 3 shows a sectioned view of the airfoil 60 according to FIG. 2 and FIG. 4 shows a side view of a portion of the airfoil body 62. The airfoil body 62 includes a first section 74 and a second section 76 that differ by coefficient of thermal expansion. The sections 74/76 are arranged in thermomechanical juxtaposition to cooperatively thermomechanically control a profile P (FIG. 2) of the airfoil body 62 responsive to varying thermal conditions. One or more additional sections that differ from sections 74/76 by coefficient of thermal expansion can also be used in thermomechanical juxtaposition to one or both of sections 74/76 to further cooperatively thermomechanically control a profile P of the airfoil body 62. In this example, the second section 76 is a core and the first section 74 is a shell that circumscribes the core 76. For example, the second section 76 can extend entirely from the first end 64 to the second end 66.

The sections 74/76 differ by composition to achieve the difference in coefficient of thermal expansion. In one example, the compositions of the sections 74/76 are different metallic materials. For example, the metallic materials are different materials selected from aluminum, aluminum alloys, titanium, titanium alloys, iron, iron alloys, nickel, nickel alloys, cobalt, cobalt alloys or combinations thereof.

Upon heating or cooling from a given temperature, the sections 74/76 thus differentially expand or contract. The difference in thermal contraction or expansion between the sections 74/76 has the tendency to distort the profile P of the airfoil body 62. By selecting the compositions, and therefore the coefficients of thermal expansion, the distortion, or lack thereof, can be controlled responsive to the varying thermal conditions. In one example, the coefficients of thermal expansion differ by at least 10%.

For instance, in the given example with the core/shell geometry, if the second section 76 were to have a higher coefficient of thermal expansion than the first section 74, the profile P of the airfoil body 62 would have a tendency to change from the illustrated contour upon an increase in temperature. Thus, the sections 74/76 cooperatively thermomechanically control the profile P responsive to the varying thermal conditions. As can be appreciated, the geometries and compositions of the sections 74/76 can be designed to achieve a desired degree of distortion, distortion to a desired profile, or used to compensate for other loads to minimize or even eliminate distortion over a temperature range.

The thermomechanical juxtaposition involves competing thermomechanical distortion between the sections 74/76. For instance, if a section is relatively thin compared to an adjacent thicker section, there will be no thermomechanical juxtaposition because the thicker section will dominate and dictate the distortion. However, above a critical dimension, the sections 74/76 cooperatively thermomechanically control the profile P. For example, the critical dimension is a through-thickness, taken perpendicular to the axis L and a camber line of the airfoil body 62, such that each of the sections 74/76 has a through-thickness that is of approximately 20% or greater than the through-thickness of the airfoil body 62.

Figure 5:
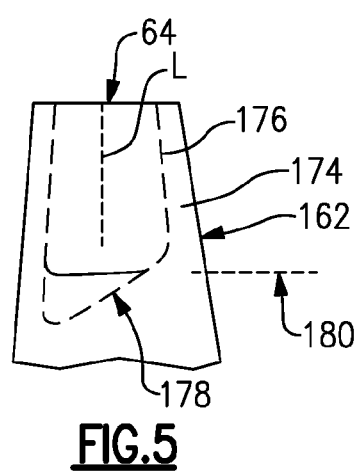
FIG. 5 illustrates another example airfoil.

FIG. 5 shows a modified airfoil body 162. In this disclosure, like reference numerals designate like elements where appropriate and reference numerals with the addition of one-hundred or multiples thereof designate modified elements that are understood to incorporate the same features and benefits of the corresponding elements. The second section 176 of the airfoil body 162 tapers, as shown at 178, in a span-wise direction along the longitudinal axis L. Alternatively, the second section 176 can terminate at a defined intermediate span of the airfoil body 162, as shown at 180. For example, the defined intermediate span is the middle third of the airfoil body 162.

Figure 6:
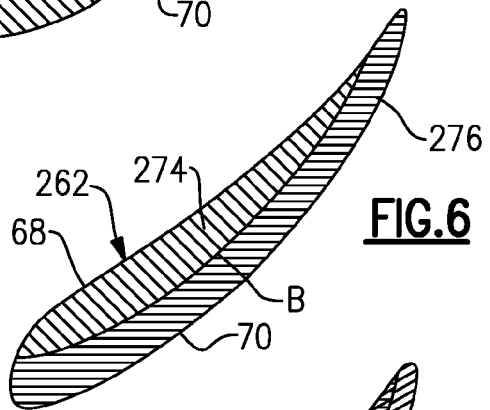
FIG. 6 illustrates another example airfoil.

FIG. 6 shows another modified example of an airfoil body 262. In this example, the first section 274 forms the first, pressure side surface 68 of the airfoil body 262 and the second section 276 forms the second, suction side surface 70 of the airfoil body 262. There is a distinct boundary B between the sections 274/276 where the composition abruptly changes between the sections 274/276.

In this example, if the second section 276 were to have a higher coefficient of thermal expansion than the first section 274, the profile P of the airfoil body 262 would have a tendency to curl or close with more curvature from the illustrated contour upon an increase in temperature. Alternatively, if the second section 276 has a lower coefficient of thermal expansion than the first section 274, the airfoil body 262 would have the tendency to flatten or open with lesser curvature upon an increase in temperature. Thus, the sections 274/276 cooperatively thermomechanically control the profile P responsive to the varying thermal conditions.

Figure 7:
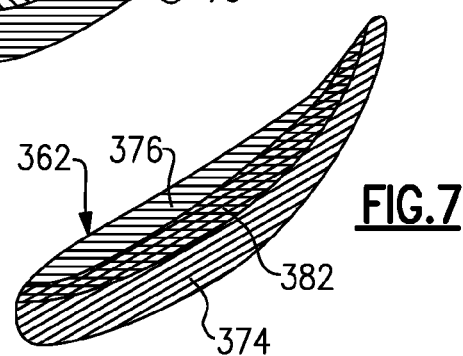
FIG. 7 illustrates another example airfoil.

FIG. 7 shows another modified airfoil body 362. In this example, the airfoil body 362 includes the first section 374, the second section 376, and a compositional gradient boundary section 382 between the first section 374 and the second section 376. In one example, the compositional gradient boundary section 382 is a gradual change in composition between the composition of the first section 374 and the composition of the second section 376. In another example, the compositional gradient boundary section 382 is preselected mixture of the composition of the first section 374 and the composition of the second section 376, such as a 1:1 mixture.

Figure 8:
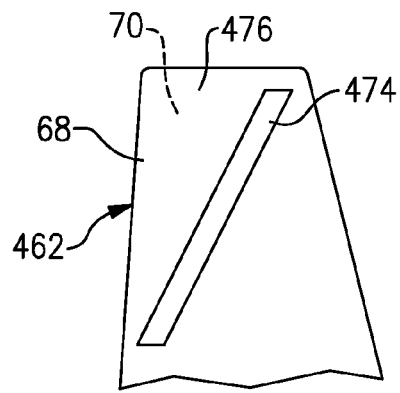
FIGS. 8-10 illustrate further example airfoils.

FIG. 8 shows another modified example of an airfoil body 462. In this example, the second section 476 defines both the first side surface 68 and the second side surface 70. In this example, the first section 474 is a band that extends across the first side surface 68 and partially covers the first side surface 68. Alternatively, or in addition to partially covering the first side surface 68, the first section 474 can also partially cover the second side surface 70. As can be appreciated, the geometry of the first section 474 can be tailored to thermomechanically control the profile P.

Figure 9:
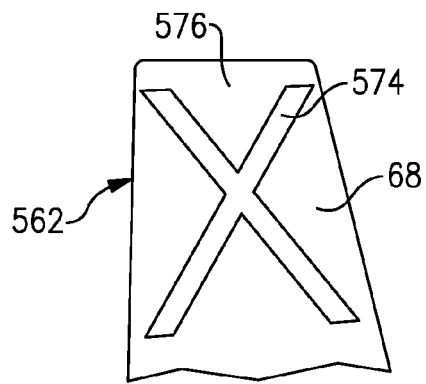
Figure 10:
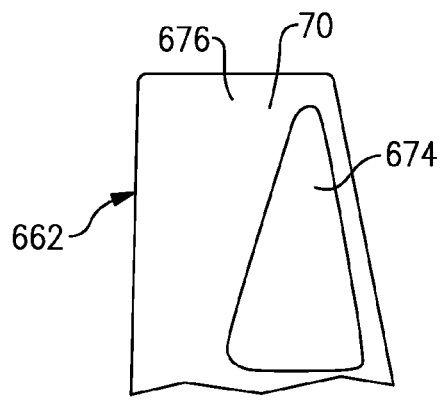

In FIG. 9, the first section 574 also partially covers the first side surface 68 of the second section 576 of the airfoil body 562 and includes a cross-pattern. In FIG. 10, the first section 674 partially covers the second side surface 70 and has a wedge-like pattern that tapers along the span of the airfoil body 662.

A method of processing an airfoil having the features disclosed herein can include an additive manufacturing process, although other techniques such as diffusion bonding, transient liquid-phase bonding or thermal spraying can alternatively or additionally be used. In additive manufacturing, powdered metal suitable for aerospace airfoil applications is fed to a machine, which may provide a vacuum, for example. The machine deposits multiple layers of powdered metal onto one another. The layers are selectively joined to one another with reference to Computer-Aided Design data to form solid structures that relate to a particular cross-section of the airfoil. The composition of the powdered metal can be varied for subsequent layers in order to provide the sections 74/76 and/or a compositional gradient, for example. In one example, the powdered metal is selectively melted using a laser sintering process or an electron-beam melting process. Other layers or portions of layers corresponding to negative features, such as cavities or openings, are not joined and thus remain as a powdered metal. The unjoined powder metal may later be removed using blown air. With the layers built upon one another and joined to one another cross-section by cross-section, an airfoil or portion thereof, such as for a repair, with any or all of the above-described geometries, may be produced. The airfoil may be post-processed to provide desired structural characteristics. For example, the airfoil may be heated to further consolidate the joined layers.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
   an airfoil body including a first section and a second section that differ in coefficient of thermal expansion by at least 10% and that each have a through-thickness that is 20% or greater than a through-thickness of the airfoil body, the second section being arranged in thermomechanical juxtaposition with the first section such that the first section and the second section cooperatively thermomechanically control a profile of the airfoil body responsive to varying thermal conditions, wherein the first section forms a pressure side of the airfoil body and a suction side of the airfoil body, and the second section is disposed on the first section and has a wedge shape that tapers toward a radially inner end of the airfoil body.

2. The airfoil as recited in claim 1, wherein the first section and the second section are different composition metallic materials.

3. The airfoil as recited in claim 2, including a compositional gradient boundary between the first section and the second section.

4. The airfoil as recited in claim 1, wherein the first section and the second section are different compositions selected from aluminum, aluminum alloys, titanium, titanium alloys, iron, iron alloys, nickel, nickel alloys, cobalt, cobalt alloys and combinations thereof.

5. The airfoil as recited in claim 1, including a distinct boundary between the first section and the second section.

6. The airfoil as recited in claim 1, wherein the first section is a core and the second section is a shell circumscribing the core.

7. The airfoil as recited in claim 6, wherein the core terminates at an intermediate span between ends of the airfoil body.

8. The airfoil as recited in claim 7, wherein the first section and the second section are different composition metallic materials.

9. The airfoil as recited in claim 8, including a compositional gradient boundary between the first section and the second section.

10. The airfoil as recited in claim 7, wherein the core tapers along a span-wise direction of the airfoil body.

11. The airfoil as recited in claim 1, wherein the second section partially covers at least one of the pressure side or the suction side.

12. A turbomachine comprising:
an airfoil including an airfoil body having a first section and a second section that differ in coefficient of thermal expansion by at least 10% and that each have a through-thickness that is 20% or greater than a through-thickness of the airfoil body, the second section being arranged in thermomechanical juxtaposition with the first section such that the first section and the second section cooperatively thermomechanically control a profile of the airfoil body responsive to varying thermal conditions, wherein the first section forms a pressure side of the airfoil body and a suction side of the airfoil body, and the second section is disposed on the first section and has a wedge shape that tapers toward a radially inner end of the airfoil body.

13. The turbomachine as recited in claim 12, further including a turbine section that includes the airfoil.

14. The airfoil as recited in claim 13, further including a compressor section and a combustor in fluid communication with the compressor section, the turbine section in fluid communication with the combustor.

15. An airfoil comprising:
an airfoil body including a first section and a second section that differ in coefficient of thermal expansion by at least 10% and that each have a through-thickness that is 20% or greater than a through-thickness of the airfoil body, the second section being arranged in thermomechanical juxtaposition with the first section such that the first section and the second section cooperatively thermomechanically control a profile of the airfoil body responsive to varying thermal conditions, wherein the first section is a core and the second section is a shell circumscribing the core.

16. The airfoil as recited in claim 15, wherein the core terminates at an intermediate span between ends of the airfoil body.

17. The airfoil as recited in claim 16, wherein the first section and the second section are different composition metallic materials.

18. The airfoil as recited in claim 17, including a compositional gradient boundary between the first section and the second section.

19. The airfoil as recited in claim 16, wherein the core tapers along a span-wise direction of the airfoil body.

* * * * *